Aug. 1, 1939.  R. E. JOHNSON  2,167,929
AUTOMOBILE
Filed July 6, 1937  4 Sheets-Sheet 1
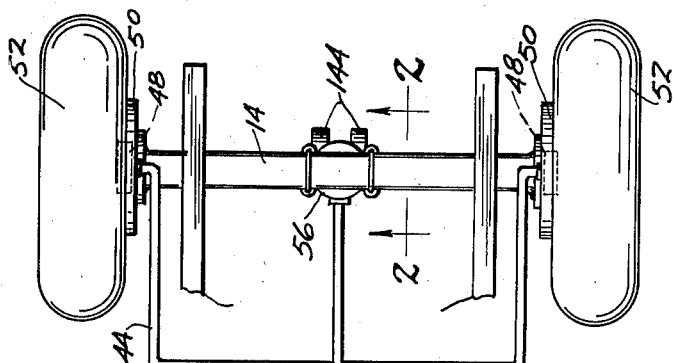
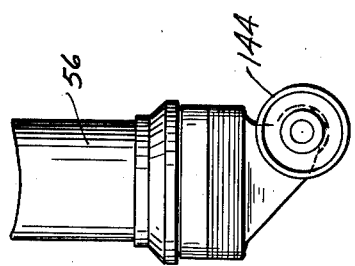
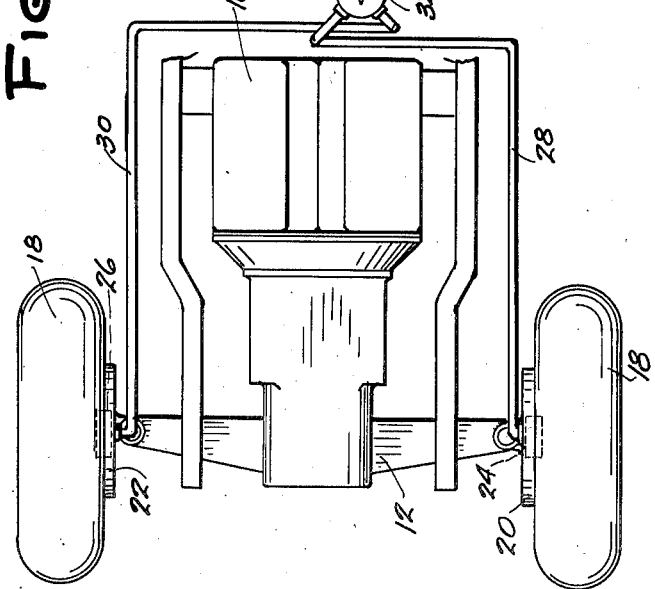
INVENTOR,
RUSSELL E. JOHNSON
BY
Jerome R. Cox
ATTORNEY.

Aug. 1, 1939.    R. E. JOHNSON    2,167,929
AUTOMOBILE
Filed July 6, 1937    4 Sheets-Sheet 2

INVENTOR.
RUSSELL E. JOHNSON
BY
Jerome R. Cox
ATTORNEY.

Aug. 1, 1939.　　　R. E. JOHNSON　　　2,167,929
AUTOMOBILE
Filed July 6, 1937　　　4 Sheets-Sheet 3
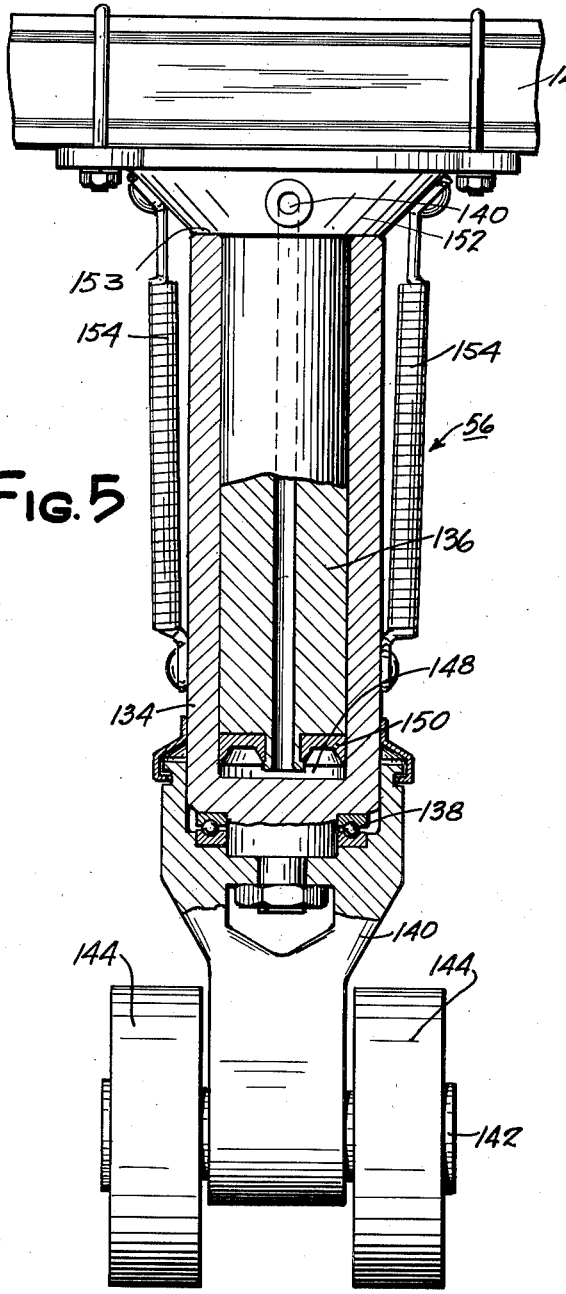
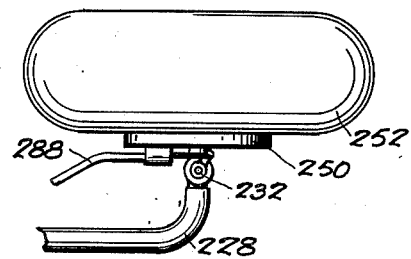
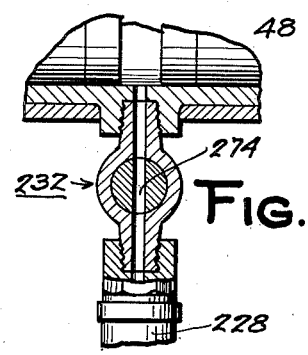
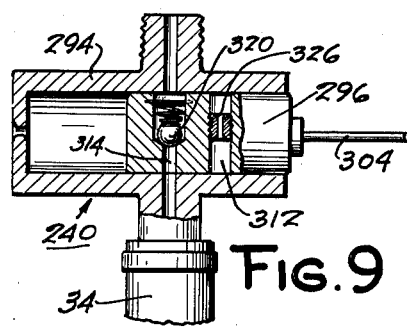
INVENTOR.
RUSSELL E. JOHNSON
BY
Jerome R. Cox
ATTORNEY.

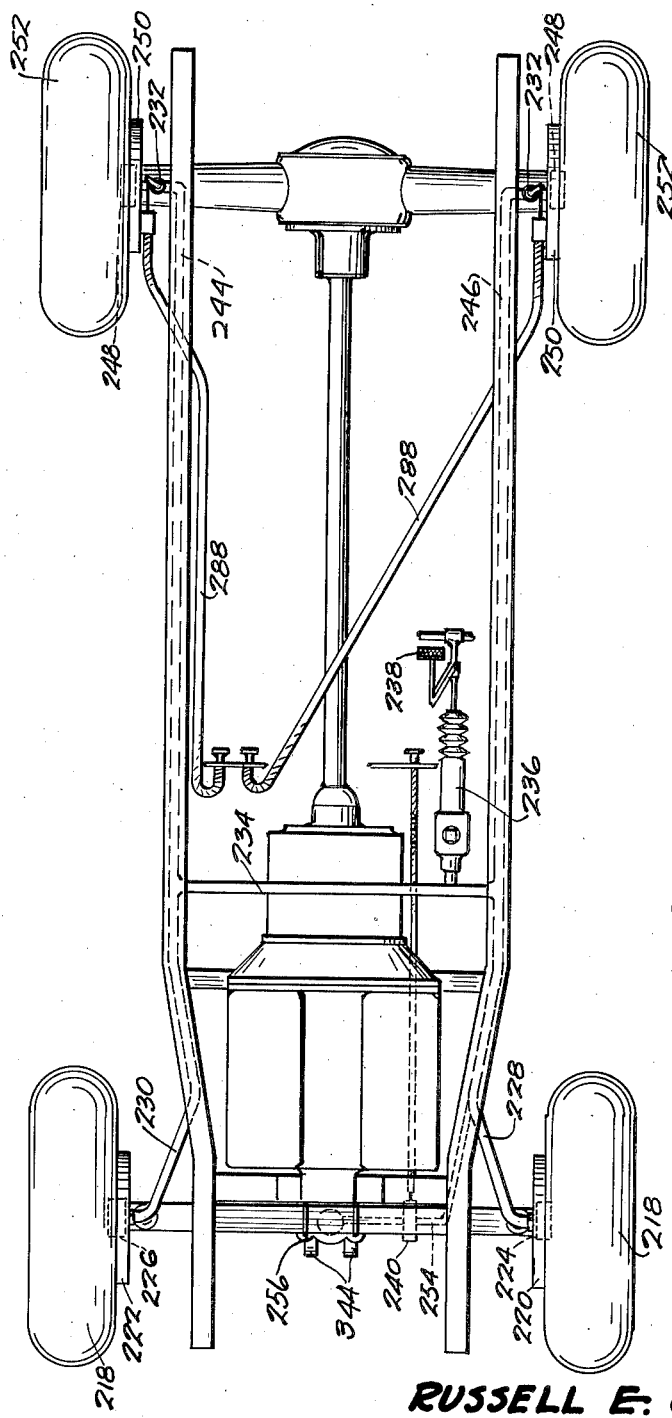

Patented Aug. 1, 1939

2,167,929

UNITED STATES PATENT OFFICE 2,167,929

AUTOMOBILE

Russell E. Johnson, Mishawaka, Ind.

Application July 6, 1937, Serial No. 151,985

4 Claims. (Cl. 180—1)

This invention relates to automobiles and more particularly to a parking system or device by means of which it is more convenient to park automobiles close to the curb of sidewalks. It is particularly useful when the parking space is so limited as to prevent any amount of forward and backward movement of the car that is so necessary when parking between two parked vehicles.

One object of the invention is the provision in combination with an automobile of means for aiding in parking said automobile.

A further object of the invention is the provision in such a combination of means for raising one end of the automobile from the street and allowing it to be moved laterally of the automobile towards the curb.

A further object of the invention is the provision of means for holding one wheel of the automobile substantially stationary while applying force to move one wheel positioned laterally of the automobile of the first mentioned wheel whereby the opposite end of the automobile will be swung laterally.

A feature of the invention relates to the use of the conventional hydraulic brake system for accomplishing the general objective of the invention.

A further feature of the invention is the provision of a hydraulic jack of novel design for raising one end of the automobile to accomplish the objective desired.

Further features of the invention relate to the use of valves for diverting fluid which is normally put under pressure by means of the hydraulic brake master cylinder from the brake system to the hydraulic jack, the use of a valve for preventing fluid from applying the brakes on one wheel of a pair of wheels, while allowing the flow of fluid to the brakes of the other wheel of the pair but preventing its return from said last mentioned brakes, and the novel arrangement of valves provided for accomplishing the object specified.

It is stated the invention broadly relates to the provision in combination with a conventional hydraulic brake system of a pair of valves separated at all times by diverting fluid from portions of the hydraulic brake system so as to accomplish a relatively simple means for parking the automobile. To accomplish this object there is provided at one end of the automobile a hydraulic jack to have fluid for diverting it by means of one of the valves mentioned, the fluid at the same time being diverted from the brakes adjacent that end of the automobile. Another valve is provided for stopping the flow of fluid to one brake at the opposite end of the automobile while allowing fluid to flow to the other brake at said end but preventing flow of fluid from this last named brake. The system is so arranged that the jack operates to raise the end of the automobile opposite to the end to which motive power is applied to the automobile. Therefore, when one end of the automobile has been raised by the jack on to a caster and motive force is applied to the wheels at the opposite end, one of which is held by the brake, the motive force moves the unbraked wheel forward or backward as the case may be and causes the opposite end of the automobile to swing on the caster to the right or left as the case may be.

As is well known, it is often desirable to park an automobile between two other cars which may be spaced so closely together that it is quite difficult to maneuver the car close to the curb in the ordinary manner. By my device parking becomes comparatively simple, as my invention relates broadly to the idea of raising one end of the car upon a jack on to a caster, holding one wheel at the opposite end of the car as by a brake, and applying moving force to the other wheel at said end so as to cause the jacked end of the car to move sideways toward the curb.

Further objects and features of the invention should be apparent after a reading of the subjoined specification and claims and after a consideration of the drawings in which:

Figure 1 is a diagrammatic plan view of a chassis of an automobile equipped with my invention;

Figure 2 is a fragmentary view in elevation of a portion of the jack used beneath the rear axle of the automobile shown in Figure 1;

Figure 5 is an enlarged view partly in elevation and partly in section of the jack shown partially in Figure 2;

Figure 6 is a view corresponding substantially to Figure 1 showing diagrammatically in plan view a chassis of an automobile embodying a form of my invention different from that shown in Figure 1;

Figure 7 is a fragmentary plan view of one of the rear wheels of the automobile shown in Figure 6;

Figure 8 is a fragmentary sectional view on an enlarged scale of the valve shown in Figure 7; and Figure 9 is a fragmentary sectional view showing the control valve for the hydraulic lines leading to the front of the automobile shown in Figure 6.

Figure 3:
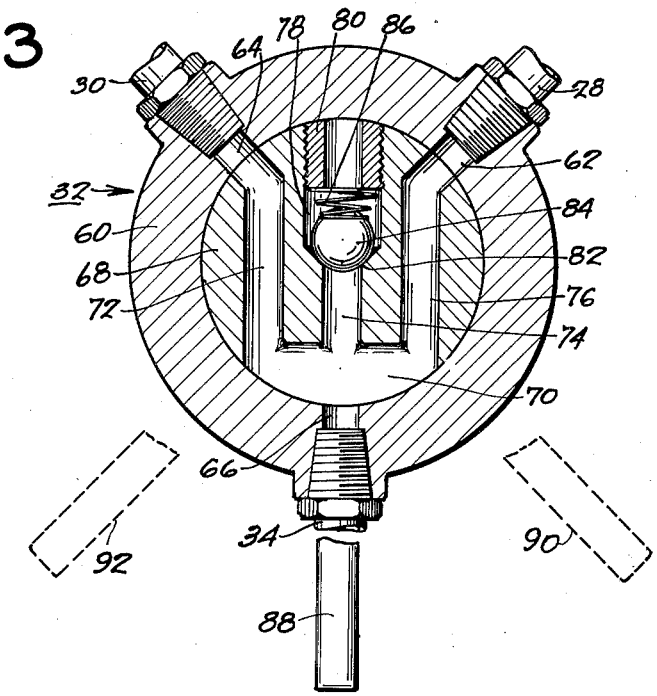
Figure 3 is an enlarged sectional view of the valve controlling the fluid lines leading to the front of the automobile shown in Figure 1.

Referring specifically to the embodiment in Figures 1 to 5 inclusive, there is disclosed a chassis 10 of an automobile having a front axle 12 and a rear axle 14. The engine 16 is supported adjacent to the front axle 12 and is arranged to drive the automobile through the front wheels 18. The front wheels 18 are provided with brakes 20 and 22 which are arranged to be operated by fluid motors 24 and 26. The fluid is supplied to the motors 24 and 26 by conduits 28 and 30 respectively, the conduits 28 and 30 being connected by a valve 32 and conduit 34 with a hydraulic brake master cylinder 36 arranged to be operated by a foot pedal 38. The conduit 34 is connected by a valve 40 and by conduits 42, 44 and 46 with brake motors 48 arranged to operate brakes 50 associated with the rear wheels 52. The rear wheels are supported upon the axle 14 and inasmuch as the automobile shown is a front wheel drive automobile, are not connected to be driven by the motor 16.

The valve 40 is also connected as by a conduit 54 with a jack 56 arranged beneath the axle 14 and provided with caster wheels 144.

The valve 32 is shown more in detail in Figure 3. It comprises means by allowing the substantially free passage of liquid from the master cylinder to the brake motors for the brakes 20 and 22, or alternatively cutting off the supply of fluid to one of said motors and allowing the flow of fluid to the other of said motors while preventing the return of fluid from said motors. As shown it comprises a casing 60 formed with a port 62 connected to the conduit 28 and with a port 64 connected to the conduit 30 and a plug for said casing provided with certain bores, the plug being designated 68. The bore 66 connected to the conduit 34 is arranged to register at all times with some portion of a recess 70 formed in the plug 68. Connected to the recess 70 are three bores 72, 74 and 76. The bore 72 is arranged normally to be connected with port 64 and the bore 76 is normally arranged to be connected with the port 62. The bore 74 is formed with an enlarged portion 78 into the end of which is threaded a plug 80. At the intersection of the small bore 74 and the enlarged portion 78 there is formed a seat 82 upon which a ball check valve 84 is arranged to sit, being urged onto its seat by a spring 86, the spring bearing at its opposite end upon the plug 80. The plug 68 may be turned from the normal position shown in Figure 3 by means of a valve handle 88 so that when the valve handle shown in dotted lines at 90, the bores 72 and 76 are moved out of registration with their associated bores 64 and 62 and the bore 74 is moved into registration with the bore 64. Likewise when the valve is moved by the handle 88 to the position in which the handle as shown in dotted lines as at 92 the bores 72 and 76 are likewise out of registration with their corresponding bores and bore 74 is moved into registration with the port 62.

Figure 4:
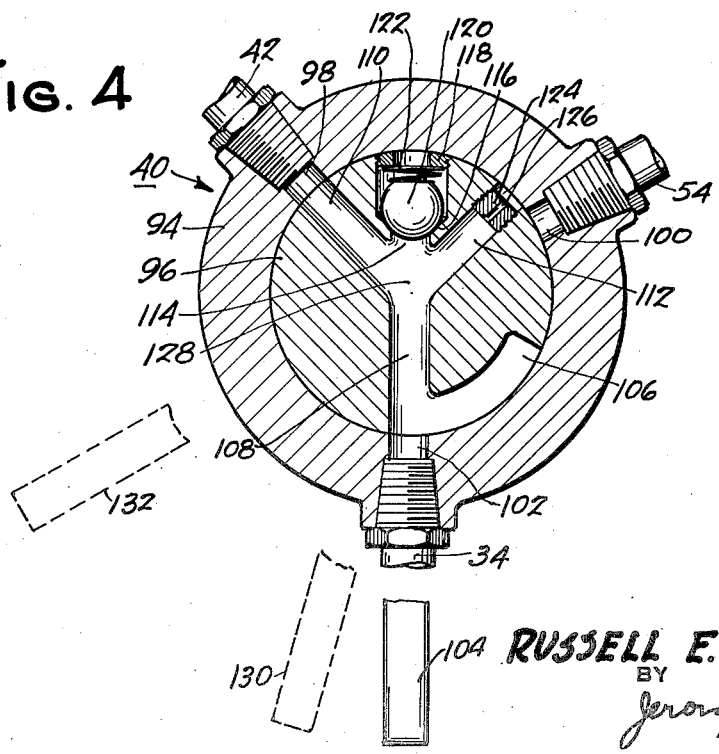
Figure 4 is an enlarged sectional view of the valve controlling the fluid lines leading to the rear of the automobile shown in Figure 1.

I also provide means for cutting off the supply of fluid to the rear brake cylinders 48 and diverting the fluid to the jack 56. This means comprises the valve 40 shown most clearly in Figure 4. This valve comprises casing 94 and a plug 96. The casing is provided with ports 98, 100 and 102 connected respectively to conduits 42, 54 and 34. The plug 96 is provided with a handle 104 and is formed with an arcual recess 106 and with several substantially radial bores. In the normal position of the valve as shown in Figure 4 a bore 108 formed in the plug 96 registers with the port 102 and a bore 110 registers with the port 98 and bore 112 is out of registration with all of the ports as is also a bore 114 formed with a seat 116 and provided with a threaded plug 118. Within the bore 114 there is inserted a ball check valve 120, urged toward the seat 116 by means of a spring 122 which acts at its opposite end upon the threaded plug 118. Inserted in the bore 112 is a plug 124 formed with a restricted passageway 126 so that while fluid may pass through said bore it may pass at only a relatively slow rate of speed. All four of the bores 108, 110, 112 and 114 are connected at a point substantially in the center of the plug 96 as for example at 128. It may be seen that with the various plugs in the position shown the conduit 34 leading from the master cylinder is connected through a port 102, the bores 108, and 110, and the port 98 with the conduit 42 leading to the brake cylinders 48 for normal use of the brakes. If however, the valve handle 104 is moved to the position in dotted lines as at 132 the conduit 34 will be connected through the recess 106 and the bore 114 controlled by check valve 122 then aligned with the port 100 through the conduit 54 and thus to the jack 56 so that operation of the master cylinder 36 will force fluid to the jack 56 to raise the car. This arrangement of the valve also allows the car when raised on the jack to be maintained in a raised position because of the trapping of fluid by the check valve 122. If it is desired then to lower the car, the handle 104 is moved to the position shown in dotted lines in Figure 4 as at 130. It will be seen that the conduit 34 is then connected through the port 102, the recess 106, the bores 108, the bore 112 and the port 100 with the conduit 54 leading to the jack 56. Thereupon fluid may return slowly, as governed by the restricted orifice 126 from the jack 56 to the master cylinder 36, thereby lowering the wheels of the car to ground engaging position again. Complete retraction of the jack is completed by the extended springs 154.

The means for raising one end of the car from the street comprises the jack 56 which is shown in detail in Figure 5. The jack comprises an outer casing 134 and an inner plunger 136. Rotatably mounted on a ball race 138 on the lower end of casing 134 is a caster carrier 140 carrying a bearing shaft 142 and a pair of caster wheels 144. The plunger 136 is formed with a central passageway 139 through which fluid is conducted from an entrance aperture 140 connected with conduit 54 to a chamber 148 formed in the casing 134. The lower end of the plunger 136 is provided with a packing cup 150 to prevent leakage of the fluid. The upper end of the plunger 136 is provided with a bracket 152 by which it is secured to the axle 14. The bracket 152 of plunger 136 also provides a stop 153 to be engaged by the casing 148 when the jack is held in the inoperative position by the springs 154. Thus fluid supplied through the conduit 54 to the jack 56 passes through the bore 139 to the chamber 148 and forces the casing 134 and the caster wheels 144 downward until the road surface is engaged by said wheels and then forces the plunger 136 together with the axle 14 and the rear end of the car upward so as to raise the rear end of the car.

It is believed that the operation will be understood from the description. However, it can be seen with the valve in the position shown in Figures 3 and 4 operation of the pedal 38 to create pressure of the master cylinder 36 forces the fluid through conduits 34, 28, 30, 42, 44 and 46 to the brake cylinders 24, 26 and 48 in the usual manner to apply the brakes and fluid may flow back free to the master cylinder when pressure on the master cylinder is released. However, if the valve 32 is turned so that the handle 88 is moved to the position 90 and the valve 94 is turned so that the handle 104 occupies the position 132, pressure exerted upon the pedal will pump fluid past the check valve 84 to the conduit 30 and thus lock the brakes on the right front wheel of the automobile. At the same time the fluid is cut off from the conduit 28 and from the brake cylinder 24 so that the brake of the left front wheel cannot be applied. At the same time the fluid passes the check valve 120 into the conduit 54 and being forced into the chamber 148 moves the caster wheels 144 downwardly to jack up the rear end of the automobile. The transmission is then put in reverse and the power applied to the left front wheel to move it rearwardly. This causes the rear end of the automobile to be moved transversely to the right of the car into the curb. It is obvious that with this arrangement it is possible to drive diagonally into a position in which the front wheels are adjacent the curb to turn the valves 32 and 40 in the proper manner and to operate the brake pedal 38 to lock the right front wheel and lift the rear of the car. Thereupon operation of the invention with the transmission engaged in reverse will move the rear of the car into the parked position with little difficulty.

In the arrangement shown in Figures 6 to 9 inclusive similar parts are indicated by the same reference numerals as are used in Figures 1 to 5 inclusive with the addition of 200. However, the automobile shown is a rear drive automobile and therefore the jack 256 is provided at the front of the car and a separate arrangement for the brakes is provided at the rear of the automobile. The valves 232 which perform the same function as the valve 32 are provided on the rear axle adjacent the brake drums 250 and are controlled by a cable and conduit arrangement 288 having connections leading to the dash. One of the valves 232 is shown more clearly in Figure 8 and is a simple plug valve so arranged that it may connect the master cylinder 236 to the wheel cylinders 48, or the bore 274 may be turned to close off the connection after the brakes have been applied and thus hold the one brake applied while the other three are released during the parking operation.

The valve 240 which performs the same function as the valve 40 is a plunger valve having casing 294 and a plunger 296. The plunger is controlled as by a cable 304 which may return to a convenient handle on the dash. The plunger 296 is provided with a pair of passageways 312 and 314. The passageway 312 is provided with a restricted port 326 and passageway 314 is provided with a ball check valve 320. With the valve in the position shown liquid may be pumped by the master cylinder into the conduit 234 past the check valve 320 through the conduit 254 into the jack 256 and also into the conduits of the brake system. In parking the vehicle one of the conduits is shut off by its associated valve 232 after the fluid pressure applies the brakes and the jack operates in a manner similar with that described in Figure 1. If the plunger 296 is moved to the position in which the bore 312 registers with the conduits 234 and 254 the liquid in the jack may flow back slowly through the restricted passageway and lower the forward end of the car. If the plunger 296 is moved to the position in which both of the bores 312 and 314 are out of registration with the conduit 234 the liquid in the master cylinder is forced through conduit 234 and branch conduits 228, 230 and 246 to the wheel brakes to operate the wheel brakes in the normal manner. When the system is being operated to raise the car by means of the jack 256 fluid is also forced into the conduits 228, 230 and 246. By reason of the fact that one of the valves 232 has been operated to shut off one of the rear wheel brake cylinders after the brake on that side has been applied, the brakes on the opposite side and front of the vehicle may be released to avoid the discomfort of holding the brake pedal down during the parking operation.

It is to be understood that the above disclosures are for the purpose of illustration only and various changes may be made therein without departing from the spirit and scope of the invention.

I claim:

1. In a parking device for an automobile which is provided with a pair of wheels at the front and with a pair of wheels at the rear and with brakes for said wheels, means for applying said brakes comprising wheel cylinders at each brake, a master cylinder, conduits connecting said wheel cylinders and said master cylinder, means comprising valve means for selectively disconnecting the wheel cylinder at one of the rear wheel brakes, and for preventing the return of pressure fluid from the wheel cylinder at said wheel brake while allowing the pressure fluid to return from the other rear wheel cylinder and for thus holding the said first named brake applied, means comprising a jack positioned adjacent to the front end of the automobile, operated by fluid pressure, and arranged to be connected by said valve means to said master cylinder whereby the front end of the automobile is raised upon said jack, and a caster associated with said jack whereby the said front end of the automobile when raised on said jack, is moved laterally for parking.

2. In a parking device for an automobile which is provided with a pair of wheels at the rear and with a pair of wheels at the front and with brakes for said wheels, means for applying said brakes comprising wheel cylinders at each brake, a master cylinder, conduits connecting said wheel cylinder and said master cylinder, means comprising a valve for selectively disconnecting the wheel cylinder at one of the front wheel brakes, and for preventing the return of pressure fluid from the wheel cylinder at the other front wheel brake while allowing the master cylinder to force pressure fluid to said wheel cylinder to apply said last named brake and for thus holding the last named brake applied, means comprising a jack positioned adjacent to the rear end of the automobile, operated by fluid pressure, and arranged to be connected by said valve to said master cylinder whereby the rear end of the automobile is raised upon said jack, and a caster associated with said jack whereby the said rear end of the automobile when raised on said jack is moved laterally for parking.

3. In a parking device for an automobile which is provided with a pair of wheels at the front and with a pair of wheels at the rear and with brakes for said wheels, means for applying said brakes comprising wheel cylinders at each brake, a master cylinder, conduits connecting said wheel cylinders and said master cylinder, valve means for selectively disconnecting the wheel cylinder at one of the wheel brakes at one end while allowing the master cylinder to force pressure fluid to the other wheel cylinder for thus holding one of the wheel brakes at said end applied, means comprising a jack positioned adjacent to the other end of the automobile, operated by fluid pressure, and arranged to be connected by said valve means to said master cylinder, whereby the said other end of the vehicle is raised upon said jack, and a caster associated with said jack whereby the said other end of the automobile when raised on said jack is moved laterally for parking.

4. In a parking device for an automobile which is provided with a pair of wheels at the front and with a pair of wheels at the rear and with brakes for said wheels, means for applying said brakes comprising wheel cylinders at each brake, a master cylinder, conduits connecting said wheel cylinders and said master cylinder, valve means for preventing the return of pressure fluid from one wheel cylinder at one end while allowing the return of pressure fluid from the other cylinder at said end for thus holding one of the wheel brakes at said end applied, means comprising a jack positioned adjacent to the other end of the automobile, operated by fluid pressure, and arranged to be connected by said valve means to said master cylinder, whereby the said other end of the vehicle is raised upon said jack, and a caster associated with said jack whereby the said other end of the automobile when raised on said jack is moved laterally for parking.

RUSSELL E. JOHNSON.